US008003034B2

(12) United States Patent
Oldani et al.

(10) Patent No.: US 8,003,034 B2
(45) Date of Patent: Aug. 23, 2011

(54) FORMING A COMPOSITE STRUCTURE BY FILAMENT PLACEMENT ON A TOOL SURFACE OF A TABLET

(75) Inventors: Tino Oldani, Rockford, IL (US); Daniel Jarvi, Rockford, IL (US)

(73) Assignee: Ingersoll Machine Tools, Inc., Rockford, IL (US)

( * ) Notice: Subject to any disclaimer, the term of this patent is extended or adjusted under 35 U.S.C. 154(b) by 1338 days.

(21) Appl. No.: 11/111,499

(22) Filed: Apr. 21, 2005

(65) Prior Publication Data

US 2005/0236735 A1    Oct. 27, 2005

Related U.S. Application Data

(60) Provisional application No. 60/564,154, filed on Apr. 21, 2004.

(51) Int. Cl.
*D01D 7/00* (2006.01)

(52) U.S. Cl. ........... 264/257; 264/299; 264/172.11; 156/189; 156/431

(58) Field of Classification Search ............ 264/257, 264/258, 324; 156/171, 181, 190
See application file for complete search history.

(56) References Cited

U.S. PATENT DOCUMENTS

| 4,557,790 A | 12/1985 | Wisbey |
| 5,022,952 A * | 6/1991 | Vaniglia ................ 156/441 |
| 5,223,072 A * | 6/1993 | Brockman et al. ......... 242/420.6 |
| 5,651,850 A | 7/1997 | Turner et al. |

OTHER PUBLICATIONS

International Search Report, International Application No. PCT/US05/13736, date of the actual completion of the international search Jun. 10, 2006, date of mailing of the international search report Jul. 6, 2006, 1 page.

* cited by examiner

*Primary Examiner* — Monica A Huson
(74) *Attorney, Agent, or Firm* — Reinhart Boerner Van Deuren P.C.

(57) ABSTRACT

A method and apparatus are provided for forming a composite structure with an automatic placement head, through the use of a non-rotating tooling tablet having first and second substantially oppositely facing surfaces thereof, joined around the peripheries thereof by a side surface of the tablet, with at least one of the first or second surfaces forming a tool surface of the tablet. Layers of pre-impregnated fiber or tape are applied to the tool surface of the tablet by the automated fiber placement head.

8 Claims, 4 Drawing Sheets

FORMING A COMPOSITE STRUCTURE BY FILAMENT PLACEMENT ON A TOOL SURFACE OF A TABLET

CROSS-REFERENCE TO RELATED PATENT APPLICATIONS

This patent application claims the benefit of U.S. Provisional patent application No. 60/564,154, filed Apr. 21, 2004, the teachings and disclosure of which are hereby incorporated in their entireties by reference thereto.

FIELD OF THE INVENTION

This invention relates to the forming of composite structures with automated fiber placement machines, and more particularly to fabrication of structural components which are not amenable to being formed on a rotating mandrel.

BACKGROUND OF THE INVENTION

Automated fiber placement machines are widely used to manufacture parts, components and structures from composite materials. The materials used in automated fiber placement are typically composed of longitudinal fibers and resin consolidated into tapes, or thin strips commonly known as "tows." Individual tapes or tows are manipulated by the fiber placement machine to form a band of material that is deposited "laid" onto a tool. Parts are built up layer by layer, with tapes or tows of composite material, with the angle at which each layer "ply" is laid onto the tool being precisely determined by the fiber placement machine.

The tool that the composite material is laid onto is often quite complex, in that the geometry of the finished part is machined into the tool surface. Depending upon the desired result, the tool may have the form of the outside "Outer Mold Line—OML" or the inside of the part "Inner Mold Line—IML".

In the past, tools used with automated fiber placement machines have typically taken the form of a rotating mandrel supported by a headstock and tailstock. As the mandrel rotates, while supported by the headstock and tailstock, the automated fiber placement machine precisely lays bands of material onto the rotating mandrel to produce full revolution parts. After the layers of composite material have been laid onto the mandrel by the fiber placement machine, the mandrel, with the composite material wrapped thereupon, is removed from the headstock and tailstock and placed into an autoclave for final curing of the composite structure. After the composite structure has been cured in the autoclave, the mandrel is removed from the finished structural part.

Although the use of rotating mandrel tools with automated fiber placement machines generally works well for cylindrical-shaped components, such as fuselage sections, and nose or tail cones in aircraft manufacture, for example, the use of rotating mandrels does present certain problems for designers and manufactures of composite structures. Because the mandrel must be placed into the autoclave with the composite structure for curing the composite material deposited on the surface of the mandrel, the autoclave is required to heat the mass of the mandrel to a sufficient temperature for curing the part, which greatly increases cycle times and operating cost for the autoclave portion of the manufacturing process. Also, because the composite materials are wrapped sequentially onto the outer surface of the mandrel, it is not possible to form an outer mold line "OML" surface on the composite structure. Additional problems are encountered, when attempting to use rotating mandrels for the formation of parts which are not symmetrical about an axis of rotation, thus creating problems and balancing the mandrel, or parts which have a cross section which is flat, complex, or otherwise constricted in such a manner that it is very difficult to remove the mandrel from the part, after the autoclave cycle.

Furthermore, there are many parts and structures which are not closed surfaces of revolution, but are instead more planar in nature. A typical example of such a part is a wing skin of an aircraft. Although wing skins are generally sculptured surfaces, the curvature involved is relatively gradual and not closed, as is the case for a fuselage part. Although rotating mandrels have sometimes been used, in the past, to form such parts, it has been necessary to provide means and manufacturing processes for essentially cutting the desired planar-shaped part away from the remainder of the wound structure, following the autoclave cycle, resulting in undesirable manufacturing cost and waste of material.

What is needed, therefore, is an improved method and apparatus for forming composite structures with an automated fiber placement machine, and in particular, an improved method and apparatus for forming composite structures having a planar, or other shape which is not amenable to production by prior automated fiber placement manufacture using rotating mandrels. It is further desirable to provide an improved method and apparatus for manufacturing the upper and lower wing skins for an aircraft with an automated fiber placement machine.

BRIEF SUMMARY OF THE INVENTION

The invention provides a method and apparatus for forming a composite structure with an automatic placement head, through use of a non-rotating tooling tablet having first and second substantially oppositely facing surfaces thereof, joined around the peripheries thereof by a side surface of the tablet, with at least one of the first or second surfaces forming a tool surface of the tablet. In practicing the invention, the automated fiber placement head is utilized for applying layers of pre-impregnated fiber or tape onto the tool surface of the tablet. When application of the fiber or tape onto the tool surface is completed, the tablet, with the pre-impregnated composite material deposited on the tooling surface thereof, is placed into an autoclave for curing of the composite structure. Because the tablet does not rotate, problems encountered in prior automated fiber placement machines, such as undesirably large mass of the tool, long heating and cooling cycle times, complexity of the mandrel design, and undesirable and unnecessary costs are significantly reduced or eliminated through practice of the invention.

In one form of the invention, a method is provided for forming a composite structure using an automated placement head for placing pre-impregnated fiber or pre-impregnated tape onto a tool surface of a tooling tablet, according to the invention. The method includes providing a tooling tablet having a first and second substantially oppositely facing surface thereof, joined around the peripheries thereof by a side surface of the tablet with at least one of the first and second surfaces forming a tool surface of the tablet. The tooling tablet is mounted adjacent the placement head, with the tool surface oriented substantially vertical and facing the placement head. A first set of pre-impregnated fibers and/or pre-impregnated tape is then placed onto the tool surface, by the placement head, to form the composite structure.

A tool surface on a tooling tablet, according to the invention, may define either an outside mold line, or an inside mold line of the composite structure, with essentially equal efficacy, thus providing significant advantage over prior automated fiber placement machines utilizing rotating mandrels.

The second side of a tooling tablet, according to the invention, may define a second tool surface, with a method, according to the invention further comprising, placing a second set of pre-impregnated fibers and/or pre-impregnated tape onto the second tool surface with the placement head, to form a second composite structure separate from the first composite structure. The first and second composite parts may be components of a common structure, such as, for example the upper and lower wing skins of an aircraft wing. The tooling tablet may be placed into an autoclave for curing the first and second composite structure simultaneously as a set, thereby potentially facilitating manufacture and inventory control.

A method, according to the invention, may further include indexing the tablet, after placement of the pre-impregnated fibers and/or pre-impregnated tape onto the first surface to form the first composite part, to thereby sequentially present the second tool surface to the placement head for forming the second composite part, so that the pre-impregnated fibers and/or pre-impregnated tapes can be placed onto both the first and second tool surfaces of the tablet by the same placement head.

In some forms of the invention, first and second fiber placement heads may be provided on opposite sides of the tablet, with the first placement head forming the first composite structure on the first tool surface, and the second placement head forming the second composite structure on the second tool surface. The first and second placement heads may be operated substantially simultaneously to form the first and second composite structures substantially simultaneously with one another.

The invention may further include providing multiple fiber placement machines on one or both sides of the tooling tablet. Multiple machines on the same side of the tooling tablet may cooperate with one another for forming a single composite structure on the tool surface on that side of the tablet.

In another form of the invention, an apparatus is provided for forming a composite structure. The apparatus includes a tooling tablet having a first and second substantially opposite facing surface thereof, joined around the peripheries thereof by a side surface of the tablet, with at least one of the first and second surfaces forming one or more tool surfaces of the tablet, and the tool surface(s) being adapted for receiving pre-impregnated fiber and/or pre-impregnated tape from an automated placement head. The tool surface(s) may define either an outside mold line or an inside mold line of the composite structure.

An apparatus, according to the invention, may further include a tablet mounting structure for mounting the tooling tablet adjacent to the placement head, with the tool surface oriented substantially vertical and facing the placement head.

The second side of a tooling tablet, according to the invention, may define a second tool surface adapted for receiving a second set of pre-impregnated fibers and/or pre-impregnated tape to form a second composite structure separate from the first composite structure.

An apparatus, according to the invention, may include one or more automated heads for applying pre-impregnated fibers and/or pre-impregnated tape to the one or more of the one or more tool surfaces defined by the first and/or second surfaces of the tablet. A tablet mounting structure may be provided for mounting the tooling tablet adjacent the one or more placement heads, with one or more tool surfaces oriented substantially vertical and facing the one or more placement heads.

Where the second side of a tooling tablet, according to the invention, defines a second surface adapted for receiving a second set of pre-impregnated and/or pre-impregnated tape from a placement head to form a second composite structure separate from the first composite structure, an apparatus, according to the invention, may further include an indexing mounting structure for the tablet, such that after placement of the pre-impregnated fibers and/or pre-impregnated tape onto the first surface to form the first composite part, the tablet may be indexed to expose a second tool surface to the placement head for forming the second composite part, so that pre-impregnated fibers and/or pre-impregnated tapes can be placed onto both the first and second tool surfaces of the tablet by one or more placement heads disposed on the same side of the tablet. An apparatus, according to the invention, may further include one or more automated heads disposed on opposite sides of the tablet for applying pre-impregnated fiber and/or pre-impregnated tape to the one or more of the one or more tool surfaces defined by the first and/or second surfaces of the tablet, with the one or more automated heads being operable in cooperation with one another to form the first and second composite structures substantially simultaneously with one another.

The invention may also take the form of an apparatus for forming an upper and a lower aircraft wing skin. Such an apparatus includes a tooling tablet having first and second substantially oppositely facing surfaces thereof, joined around the peripheries thereof by a side surface of the tablet. The first surface of the tablet defines a first tool surface for forming the upper wing skin, and the second tablet surface defines a second tool surface for forming the lower wing skin separate from the upper wing skin, with the first and second tool surfaces being adapted for separately receiving pre-impregnated fiber and/or pre-impregnated tape from one or more automated placement heads operatively disposed adjacent one or both of the first and second surfaces of the tablet.

Other aspects, objectives and advantages of the invention will become more apparent from the following detailed description when taken in conjunction with the accompanying drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
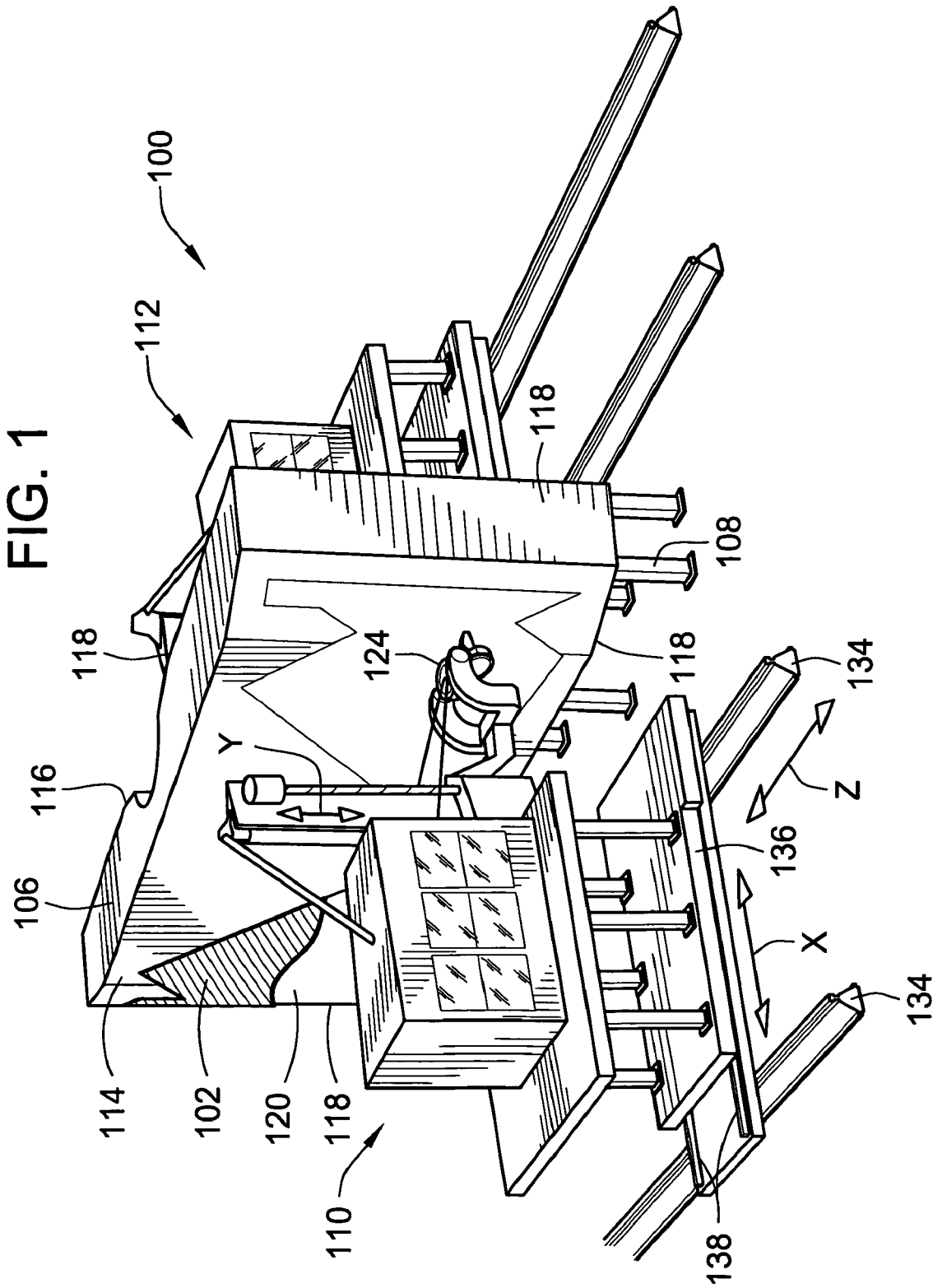
FIG. 1 is a perspective illustration of a first exemplary embodiment of an apparatus for automated fiber placement on a tool surface of a tablet, according to the invention.
Figure 2:
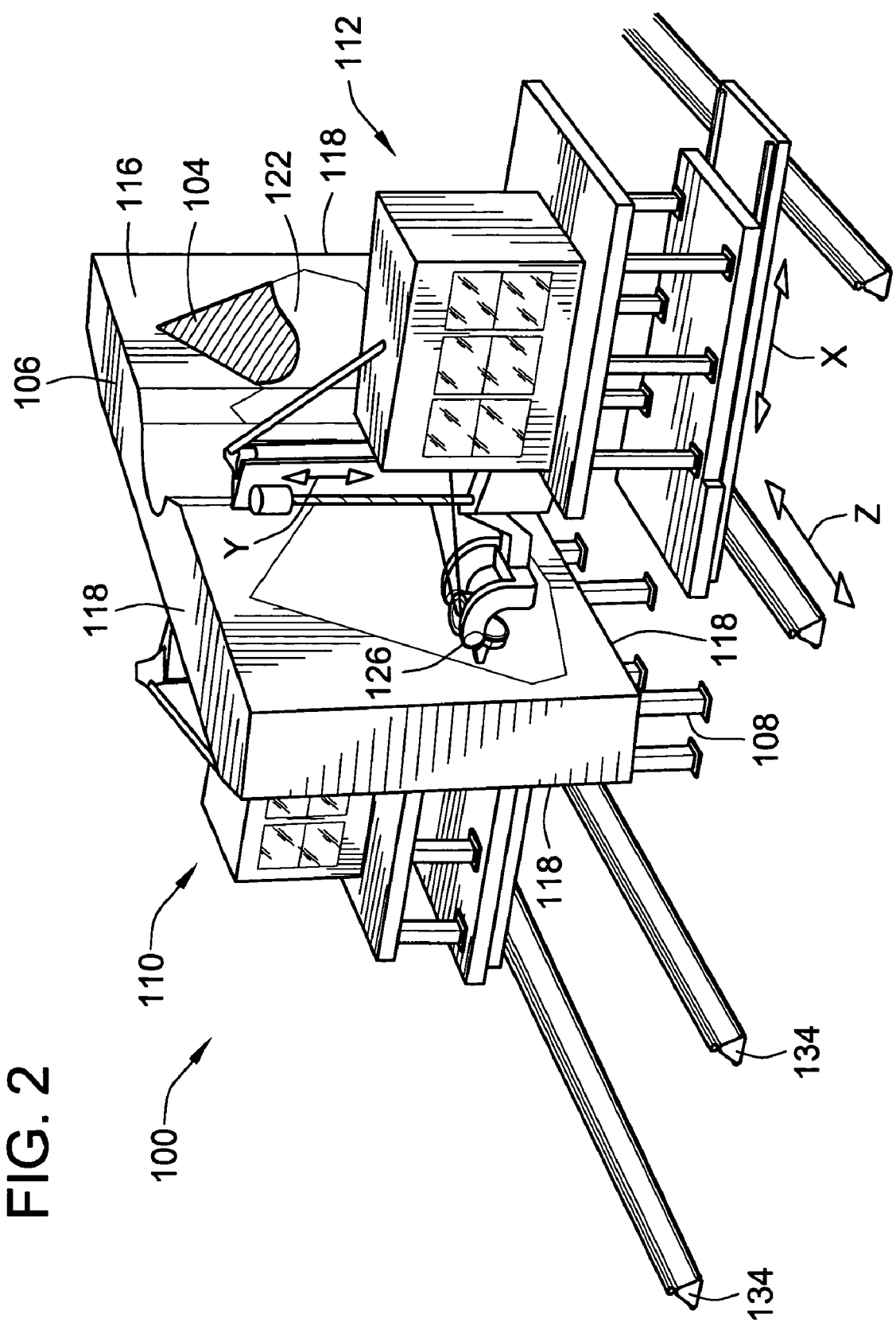
FIG. 2 is an opposite angled perspective view of the apparatus of FIG. 1.

FIGS. 1 and 2 show a first exemplary embodiment of the invention in the form of an apparatus 100 for simultaneously forming the upper and lower skin 102, 104 for an aircraft wing. The apparatus 100 includes a tooling tablet 106 mounted on an indexing tablet mounting structure 108 between a first and a second fiber placement machine 110, 112.

The tooling tablet 106 includes first and second substantially oppositely facing surfaces 114, 116 thereof, joined around their peripheries by a side surface 18 of the tablet 106. The first and second surfaces 114, 116 of the tooling tablet 106 of the exemplary embodiment, respectively form first and second tool surfaces 120, 122 of the tablet 106. The first and second tool surfaces 120, 122 are each adapted for receiving pre-impregnated and/or pre-impregnated tape from automated placement heads 124, 126, of the first and second fiber placement machines 110, 112 respectively, for formation of the upper and lower wing skins 102, 104 respectively.

The side surface 118 of the tooling tablet 106 of the exemplary embodiment of the apparatus 100 is comprised of several flat segments thereof, joined together around the generally rectangular shaped peripheries of the first and second surfaces 114, 116 of the tablet 106. It is understood, however, that in other embodiments of the invention where the first and second surfaces 114, 116 of the tablet 106 define curved or rounded peripheries thereof, the side surface 118 of such a curved or rounded tablet 106 may form a continuous curved surface.

It will be further understood that the first and second surfaces of a tooling tablet, according to the invention, may be faceted, contoured, or otherwise configured to facilitate movement of the fiber placement head across the tool surface, or surfaces, of the tablet. A tool surface, according to the invention, may also be raised or recessed, slightly from the surrounding surface of the tablet, to facilitate placement of the pre-impregnated fiber and/or pre-impregnated tape onto the tool surface. In some embodiments, a tool surface may have a periphery exactly matching the periphery if the composite structure to be laid-up thereon. In other embodiments of the invention, however, the periphery of the tool surface may differ slightly from the periphery of the composite structure to be fabricated thereon, to provide for trim allowance, or overrun of the fiber placement head.

In the exemplary embodiment of the apparatus 100, the first and second tool surfaces 120, 122 provide outside mold line definition of the actual outside surfaces of the upper and lower wing skins 102, 104. In other embodiments of the invention, either or both of the first and second tool surfaces 120, 122 could be configured to form inside mold line surfaces of the composite structures formed on the tablet 106.

The tablet mounting structure 108 of the first exemplary embodiment of an apparatus 100, according to the invention, is a simple stand, including locating provisions thereon (not shown), which mate with corresponding locating provisions (also not shown) in the side surface 118 of the tablet 106, for accurately and precisely position the tablet 106 between the first and second fiber placement machines 110, 112. The locating provisions may be configured to allow the tablet to be installed onto and removed from the mounting stand with a crane. In other embodiments of the invention, it is contemplated that the tablet mounting structure 108 may take the form of a conveyer, a cart guided either manually or automatically, a rail guided cart, or any other appropriate mechanism for moving the tablet 106 into position between the first and second fiber placement machines 108, 110.

The tablet mounting stand 108, may also be configured for indexing the tablet 106, in such a manner that after placement of the pre-impregnated fibers and/or pre-impregnated tape onto the first surface 120, to form the first composite part 102, the tablet 106 may be indexed to expose the second tool surface 122 to the placement head 124 of the first fiber placement machine 110 for forming the lower wing skin 104, so that the pre-impregnated and/or pre-impregnated tapes can be placed onto both the first and second tool surfaces 120, 122 of the tablet 106 by one or more placement heads, such as the placement head 124 located on only one side of the tablet mounting stand 108. Through the use of such an indexing tablet mounting stand 108, a tablet 106, according to the invention, may be used for forming both the upper and lower wing skins 102, 104 in circumstance where only a single fiber placement machine 110, and/or head 124 are available.

Figure 3:
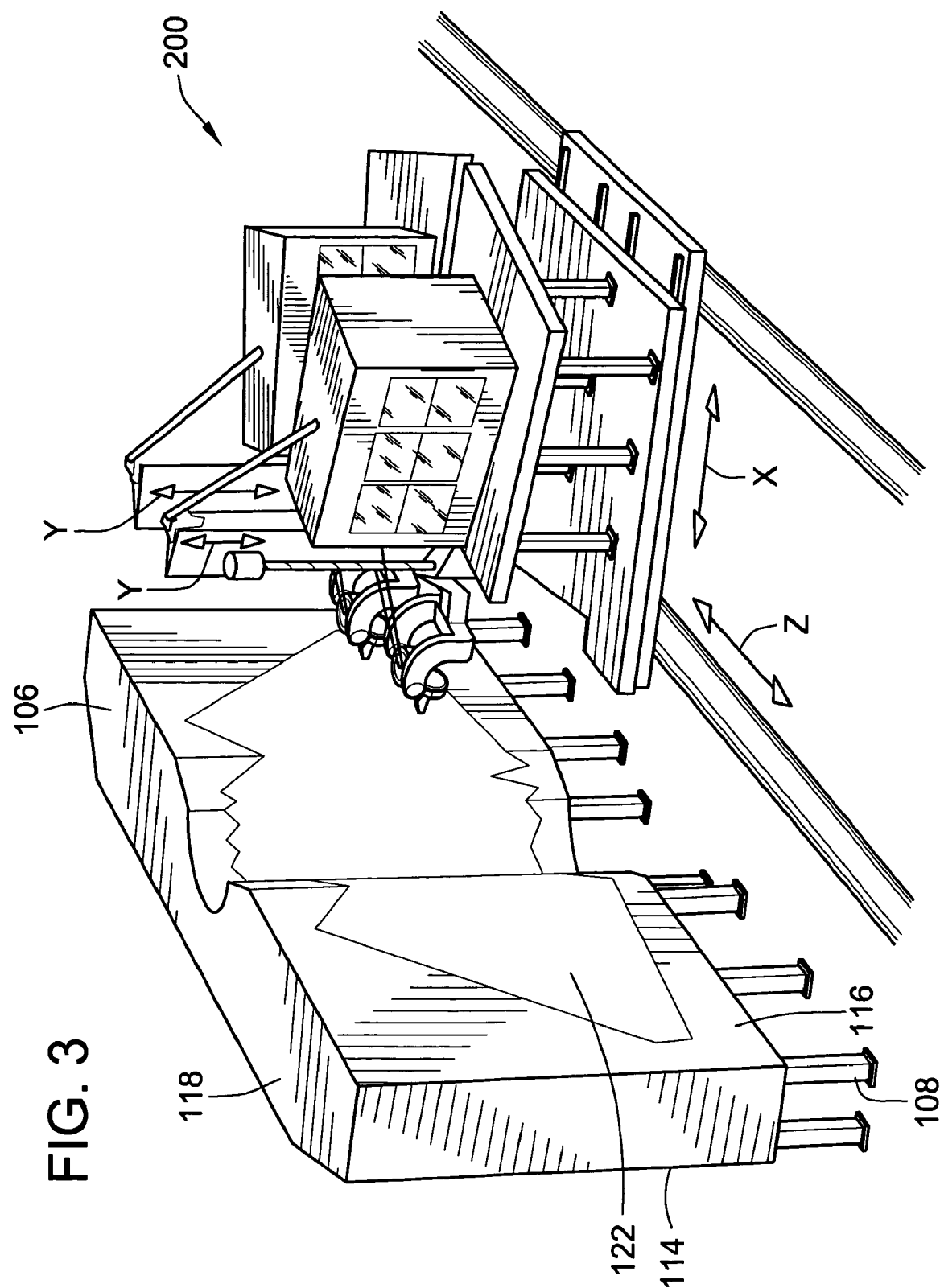
FIG. 3 is a perspective illustration of an alternate embodiment of the invention, having 2 fiber placement machines located on the same side of a tooling tablet, according to the invention.

It will be further understood, by those having skill in the art, that the invention may be practiced with two or more fiber placement heads, and/or fiber placement machines, located on the same side of the tablet 106, as shown in FIG. 3, depicting a second exemplary embodiment of an apparatus 200 according to the invention. Where multiple placement heads or machines are utilized, they may be controlled in any appropriate manner, such as the method disclosed in a United States patent application, entitled "AUTOMATED FIBER PLACEMENT USING MULTIPLE PLACEMENT HEADS, REPLACEMENT CREELS, AND REPLACABLE PLACEMENT HEADS," 11/111,500, assigned to the Assignee of the present invention, and incorporated herein by reference.

Use of a tooling tablet, in accordance with the invention, provides an additional advantage over prior fiber placement apparatuses utilizing a rotating mandrel, in that the fiber placement machines can also be simplified. In a typical prior fiber placement machine, used in a fiber placement apparatus having a rotating mandrel, a fiber placement head is typically mounted on a boom that rotates through an arc, in order to allow the fiber placement head to travel far enough around the rotating mandrel so that the fiber or tape may be properly positioned completely around the mandrel.

Figure 4:
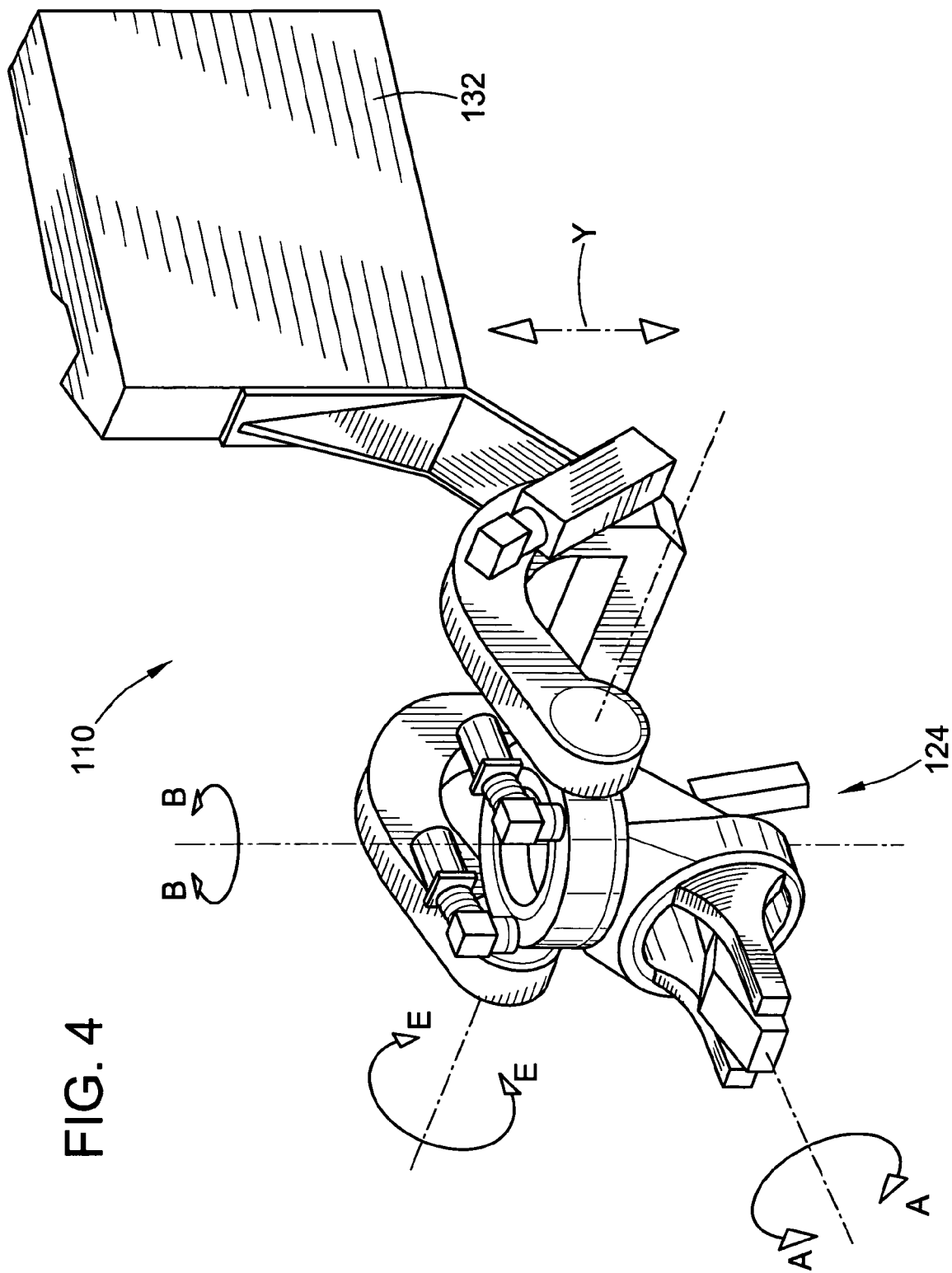
FIG. 4 is a perspective illustration of an automated fiber placement head, of the embodiments shown in FIGS. 1-3.

Through practice of the invention, the boom used in prior fiber placement machines may be eliminated, and the fiber placement head mounted in a manner which is simpler and more robust, and more in keeping with standard practices for multi-axis machining equipment. As shown in FIGS. 1 and 4, the fiber placement head 124 of the first fiber placement machine 110 is operatively attached for vertical movement along a triangular beam 132 of the fiber placement machine 110, to allow movement of the fiber placement head 126 along a vertical axis Y-Y. As shown in FIG. 4, the fiber placement head 126 is further configured for rotation about three axes A-A, E-E, and B-B. As shown in FIG. 1, the first fiber placement machine 110 is mounted on rails 134 extending generally parallel to the tablet 106. Movement of the first fiber placement machine 110 along the rails 134 provides positioning of the fiber placement head along a Z-Z axis. The first fiber placement machine 110 is mounted to the rails 134 by a moveable platform 136 including ways 138 which allow the fiber placement machine 110 to move toward or away from the tablet 106 along an X-X axis. Those having skill in the art will recognize that by mounting the fiber placement head 124 in this manner, the orientation of axes, and control of the position of the fiber placement head can be accomplished in a manner very similar to that used for 5-axis milling machines.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for forming a composite structure, using an automated fiber placement head for placing pre-impregnated fiber tows onto a tool surface, the method comprising:
    providing a tooling tablet having a first and second substantially oppositely facing surface thereof, joined around the peripheries thereof by a side surface of the tablet, with at least one of the first and second surfaces forming a tool surface of the tablet;
    mounting the tooling tablet stationary and adjacent the fiber placement head, with the tool surface oriented substantially vertical and facing the fiber placement head;
    placing a first set of pre-impregnated fiber tows onto a tool surface with the fiber placement head to form the composite structure; and
    wherein the second side of the tooling tablet defines a second tool surface, and the method further comprises placing a second set of pre-impregnated fiber tows onto a second tool surface with the fiber placement head to form a second composite structure separate from the first composite structure.

2. The method of claim 1, wherein the first and second composite parts are components of a common structure.

3. The method of claim 2, further comprising placing the tablet into an auto clave for curing the first and second composite structures simultaneously as a set.

4. The method of claim 1, wherein the method further comprises indexing the tablet, after placement of the pre-impregnated fiber tows onto the first surface to form the first composite part, to thereby sequentially present the second tool surface to the fiber placement head for forming the second composite part, so that the pre-impregnated fiber tows can be placed onto both the first and second tool surfaces of the tablet by the same fiber placement head.

5. The method of claim 1, wherein the fiber placement machine of claim 1 is a first fiber placement head, and the method further comprises providing a second fiber placement head disposed on an opposite side of the tablet from the first fiber placement head for forming the second composite structure on the second tool surface.

6. The method of claim 5, further comprising operating both the first and second fiber placement heads to form the first and second composite structures substantially simultaneously with one another.

7. The method of claim 1, wherein the fiber placement machine of claim 1 is a first fiber placement head, and the method further comprises providing at least one additional fiber placement head for forming the composite structure on the first tool surface in cooperation with the first fiber placement head.

8. The method of claim 7, further comprising, disposing one or more of the adjacent fiber placement heads on the opposite side of the tablet from the first fiber placement head, so that the first and additional fiber placement heads, in cooperation with one another, form the first and second composite structures substantially simultaneously with one another.

* * * * *